No. 786,581. Patented April 4, 1905.

UNITED STATES PATENT OFFICE.

HARRY EAST MILLER, OF OAKLAND, CALIFORNIA.

PROCESS OF TREATING METALLIC LEAD.

SPECIFICATION forming part of Letters Patent No. 786,581, dated April 4, 1905.

Application filed July 21, 1903. Serial No. 166,494.

*To all whom it may concern:*

Be it known that I, HARRY EAST MILLER, a citizen of the United States, residing at Oakland, in the county of Alameda and State of California, have invented certain new and useful Improvements in Processes of Treating Metallic Lead; and I do hereby declare the following to be a full, clear, and exact description of the same.

This invention relates to a process of treating commercial metallic lead to increase its capability of withstanding the corrosive effect of acids and its resistance to other chemical change.

It has for its object the accomplishment of the desired result in a cheap, practical, and efficient manner.

Heretofore much difficulty, expense, and loss of time have been experienced in those industries and manufactures in which hot sulfuric and other acids are employed, owing to the rapid deterioration of the leaden acid-containing vessels and conduits.

It is found in practice that lead from different locations or different metallurgical works show a marked difference in capability of resisting corrosion, notwithstanding that all the samples are practically pure lead in which the impurities, if any, exist merely as traces, such as the most refined analysis alone would disclose. Specimens of lead which differ as to their purity to the extent of not more than ten parts in one hundred thousand present marked contrasts as to their resistance to chemical change, some lasting several years; while others "turn to mush" in a few weeks under like conditions of use.

By subjecting ordinary commercial lead to the process hereinafter described the resulting product will be found to have acquired a capability of resisting the corrosion of hot acid equal to that of the most satisfactory specimens, regardless of its natural source or previous process of manufacture, so that the metal resulting from this process is of uniform and high excellence in the desired characteristic.

My process of treatment consists in first oxidizing the metallic lead preferably to the form of litharge. The oxidation is allowed to proceed till a large percentage—say ninety-five per cent.—of the metallic lead is converted into oxid. The oxid and residuum are then separated and the litharge then converted into metallic form. The residual metallic lead need not be waste, as it also has acquired qualities which make it valuable for other purposes.

The individual steps in this process—oxidation, separation, and reconversion—may be performed by any of the known methods or means.

What I claim as new, and desire to secure by Letters Patent, is—

1. The process of treating metallic lead consisting in converting a portion thereof to its oxid, separating the oxid and residuum and reducing the oxid to metal form.

2. The process of treating metallic lead consisting in converting a portion thereof to litharge, separating the litharge and residuum, and reducing the litharge to metal form.

3. The process of treating metallic lead consisting in converting the major portion thereof to its oxid, separating the oxid and residuum, and reducing the oxid to metal form.

4. The process of treating metallic lead consisting in converting the major portion thereof to litharge, separating the litharge and residuum and reducing the litharge to metal form.

5. The process of treating metallic lead consisting in converting approximately ninety-five per cent. thereof to its oxid, separating the oxid and residuum, and reducing the oxid to metal form.

6. The process of treating metallic lead consisting in converting approximately ninety-five per cent. thereof to litharge, separating the litharge and residuum and reducing the litharge to metal form.

HARRY EAST MILLER.

Witnesses:
JOHN D. GISH,
W. H. SMYTH.